United States Patent [19]

Brenner

[11] 4,175,069

[45] Nov. 20, 1979

[54] PLASTICIZATION OF NEUTRALIZED SULFONATED ELASTOMERIC POLYMER

[75] Inventor: Douglas Brenner, Livingston, N.J.

[73] Assignee: Exxon Research & Engineering Co., Florham Park, N.J.

[21] Appl. No.: 947,430

[22] Filed: Oct. 2, 1978

Related U.S. Application Data

[63] Continuation-in-part of Ser. No. 855,547, Nov. 29, 1977, Pat. No. 4,131,587.

[51] Int. Cl.² .............................................. C08K 5/18
[52] U.S. Cl. ........................ 260/32.6 A; 260/DIG. 31
[58] Field of Search .................................. 260/32.6 A

[56] References Cited

U.S. PATENT DOCUMENTS

| | | | |
|---|---|---|---|
| 3,847,854 | 11/1974 | Canter et al. | 260/23.7 M |
| 4,131,587 | 12/1978 | Brenner | 260/32.6 A |

*Primary Examiner*—Lewis T. Jacobs
*Attorney, Agent, or Firm*—Richard E. Nanfeldt

[57] ABSTRACT

This invention relates to an improved elastomeric composition of metal neutralized sulfonated elastomeric polymers which are plasticized with critically selected polydentate amines wherein the plasticized compositions have improved rheological properties. These elastomeric compositions can be processed on conventional plastic fabrication equipment into high performance elastomeric articles.

12 Claims, No Drawings

PLASTICIZATION OF NEUTRALIZED SULFONATED ELASTOMERIC POLYMER

CROSS REFERENCE TO RELATED APPLICATIONS

The instant application is a CIP application of Ser. No. 855,547, filed Nov. 29, 1977, now U.S. Pat. No. 4,131,587, issued Dec. 26, 1978.

BACKGROUND OF THE INVENTION

1. Field of the Invention

This invention relates to an improved elastomeric composition of metal neutralized sulfonated elastomeric polymers which are plasticized with critically selected polydentate amines wherein the plasticized compositions have improved rheological properties. These elastomeric compositions can be processed on conventional plastic fabrication equipment into high performance elastomeric articles.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are basic materials selected from Groups I, II, III, IV, V, VIB, VIIB and VIII and mixtures thereof of the Periodic Table of Elements. Although these sulfonated elastomeric polymers prepared by the process of U.S. Pat. No. 3,642,728 are readily usable in a certain number of limited applications, they are not as readily adaptable for the manufacture of an injection moldable elastomeric article such as footwear as are the improved compositions of the present invention, wherein improved rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The improved compositions of the present invention are neutralized with inorganic counterions.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions of this patent are based on plastic backbones, whereas compositions of the present invention are based on elastomeric backbones. The compositions formed by the process of U.S. Pat. No. 3,870,841 are not as suitable for the manufacture of high performance elastomeric articles such as elastomeric tubing formed by an extrusion process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. However, the plasticizers falling within this criterion exhibit a very large range in plasticizing effectiveness so this criterion gives no help in choosing which chemicals will be most effective in improving processability of the sulfonated polymer. This invention fails to teach the use of the critically selected polydentate amines of the instant invention as plasticizers. The inventive concept of the present instant invention clearly teaches the use of certain critically selected polydentate amines as preferential plasticizers in order to achieve improved rheological properties. Furthermore, these selected polydentate amines do not fall into the classes taught in U.S. Pat. No. 3,847,854; they are not volatile plasticizers since they substantially remain in the polymer after fabrication, and they are not non-volatile plasticizers as taught by this patent because they are liquids over the use temperature range.

SUMMARY OF THE INVENTION

The present invention relates to improved compositions of metal neutralized sulfonated elastomeric polymers being preferentially plasticized with about 0.1 to about 40 parts by weight of critically selected polydentate amines based on 100 parts by weight of the metal neutralized EPDM terpolymer, more preferably about 0.3 to about 30 and most preferably about 9 to about 25. These improved compositions exhibit excellent rheological properties for a variety of metal counterions which were previously unattainable at low concentrations of an organic plasticizer by the teachings of the prior art. The compositions of the present invention are processed on conventional plastic fabrication equipment such as extruders into high performance elastomeric articles such as elastomeric hose.

Accordingly, the present instant invention teaches unique and novel compositions of metal neutralized sulfonated elastomeric polymers being preferentially plasticized with critically selected polydentate amines thereby providing elastomeric articles which can be formed on conventional plastic fabricating equipment, wherein the compositions can be optionally modified with fillers, extender oils, waxes or polyolefinic thermoplastics and mixtures thereof.

GENERAL DESCRIPTION

This present invention relates to unique and novel elastomeric compositions of a metal neutralized sulfonated elastomeric polymer being preferentially plasticized with critically selected polydentate amines wherein the compositions can exhibit a substantial improvement in flow properties with a variety of different metal counterions at relatively low plasticizer concentrations. Thus, essentially intractable sulfonated polymers can be made to process readily in conventional molding or extrusion operations.

The metal neutralized sulfonated elastomeric polymers of this present instant invention are derived from unsaturated polymers which include low unsaturated elastomeric polymers such as Butyl rubber, or EPDM terpolymers.

The expression "Butyl rubber" as employed in the specification and claims is intended to include copolymers made from a polymerization reaction mixture having therein from 70 to 99.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082. The preferred polymers contain about 40 to about 80 wt. % ethylene and about 1 to about 10 wt. % of a diene monomer, the balance of the polymer being propylene. Preferably, the polymer contains about 45 to about 75 wt. % ethylene, e.g. 50 wt. % and about 2.6 to about 8.0 wt. % diene monomer, e.g. 5.0 wt. %. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 50 and having an ethylene content of about 50 wt. % and a 5-ethylidene-2-norbornene content of about 5.0 wt. %. The $\overline{M}n$ as measured by GPC of Vistalon 2504 is about 47,000, the $\overline{M}v$ as measured by GPC is about 145,000 and the $\overline{M}w$ as measured by GPC is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ as measured by GPC of Vistalon 2504-20 is about 26,000, the $\overline{M}v$ as measured by GPC is about 90,000 and the $\overline{M}w$ as measured by GPC is about 125,000.

Nordel 1320 (DuPont) is another terpolymer having a Mooney viscosity at 212° F. of about 25 and having about 53 wt. % of ehtylene, about 3.5 wt. % of 1,4-hexadiene, and about 43.5 wt. % of propylene.

The EPDM terpolymers of this invention have a number average molecular weight ($\overline{M}n$) as measured by GPC of about 10,000 to about 200,000; more preferably of about 15,000 to about 100,000; most preferably of about 20,000 to about 60,000. The Mooney viscosity (ML, 1+8, 212° F.) of the EPDM terpolymer is about 5 to about 60, more preferably about 10 to about 50, and most preferably about 15 to about 40. The $\overline{M}v$ as measured by GPC of the EPDM terpolymer is preferably below about 350,000 and more preferably below about 300,000. The $\overline{M}w$ as measured by GPC of the EPDM terpolymer is preferably below about 500,000 and more preferably below about 350,000.

The polymer is sulfonated by dissolving the elastomeric polymer in a non-reactive solvent such as a chlorinated aliphatic hydrocarbon, chlorinated aromatic hydrocarbon, an aromatic hydrocarbon or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a tempeature of about −10° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as a cyclohexanol or with water. The sulfonated elastomeric polymer has about 10 to about 80 meq. sulfonate groups per 100 grams of sulfonated polymer, more preferably about 15 to about 60; and most preferably about 20 to about 50. The meq. of sulfonate groups/100 grams of polymer is determined by both titration of the polymeric sulfonic acid and Dietert Sulfur analysis. In the titration of the sulfonated polymer, the polymer is dissolved in a solvent consisting of 95 parts of toluene and 5 parts of methanol at a concentration level of 50 grams per liter of solvent. The sulfonated polymer is titrated with ethanolic sodium hydroxide to an Alizarin-Thymolphthalein endpoint.

Neutralization of the sulfonated elastomeric polymer is done, for example, by the addition of a solution of neutralizing agent such as a metal acetate to the sulfonated elastomeric polymer dissolved in the mixture of the aliphatic alcohol and non-reactive solvent. The metal acetate is dissolved in a binary solvent system consisting of water and/or aliphatic alcohol. Typically, but non-limiting metal acetates are sodium acetate, barium acetate, magnesium acetate, aluminum acetate, potassium acetate, lead acetate, and zinc acetate, wherein the sodium, magnesium, barium, and zinc acetates are preferred.

Sufficient neutralizing agent is added to the solution of the sulfonated elastomeric polymer to effect neutralization of the sulfonate groups. It is preferable to neutralize at least 95% of the sulfonate groups, more preferably about 98%, most preferably 100%. Metal oxides and hydroxide such as ZnO and $Mg(OH)_2$ can also be employed to effect the neutralization of the sulfonate groups. The metallic salt used as a neutralizing agent has a metal ion selected from the group consisting of iron, lead, antimony and Groups IA, IIA, IB and IIB of the Periodic Table of Elements.

The resultant neutralized sulfonated terpolymer has a melt viscosity which is dependent upon the molecular weight of the base polymer, the level of sulfonation, and the associated cation. An EPDM with an original Mooney viscosity (ML, 1+8, 212° F.) of about 55, containing about 40 meq. sulfonate/100 grams of sulfonated EPDM and possessing cations such as mercury, magnesium, calcium, cobalt, lithium, barium, sodium and the like may crumble upon exiting from a capillary rheometer at 200° C. at a shear rate of 0.73 $sec^{-1}$ and will possess an apparent viscosity in excess of $5 \times 10^6$ poise. An EPDM with an original Mooney viscosity (ML, 1+8, 212° F.) about 20, containing about 30 meq. sulfonate/100g of sulfonated EPDM, and possessing cations such as zinc and lead possess apparent viscosities of from about $10^6$ to about $10 \times 10^6$ poise at a shear rate of 0.73 $sec^{-1}$ at 200° C.

On the other hand the physical properties of the unplasticized sulfonated and neutralized elastomers improve with increasing sulfonate content. Good development of physical properties usually starts to occur when about 20 meq. sulfonate/100 g polymer are present, and the physical properties obtained at 30 meq. sulfonate/100 g polymer and higher are preferred. However, even at these higher levels of sulfonate the unplasticized neutralized sulfonated elastomers still possess relatively modest physical properties, and the melt viscosities are so high that mixing or processing these gums in the absence of a plasticizer on conventional equipment is often extremely difficult if not impossible.

U.S. Pat. No. 3,847,854 addressed itself to the problem of melt processability in metal sulfonate-containing elastomers, and a large number of materials are claimed as plasticizers that would give the ionomers lower melt viscosities at processing temperatures and thereby permit melt fabrication. However, many of the materials included are relatively poor flow improvers.

U.S. Pat. No. 3,847,854 teaches that the effective flow improvers have an adverse effect on physical properties and therefore directs that no more than 6–7 wt. % of a non-volatile plasticizer be used about which improvement in melt flow was taught to be associated with a loss in physical properties.

It has been found among a large number of functional organic compounds that a critically selected class of polydentate amines provide for markedly improved flow properties at relatively low plasticizer concentrations. Contrary to the teachings of U.S. Pat. No. 3,847,854 these amines maintain satisfactory physical properties for some applications in addition to substantial improvements in melt flow with increasing amine concentration well beyond 8 parts by weight of amine/100 polymer.

The critically selected polydentate amines have a structure selected from the group consisting of:

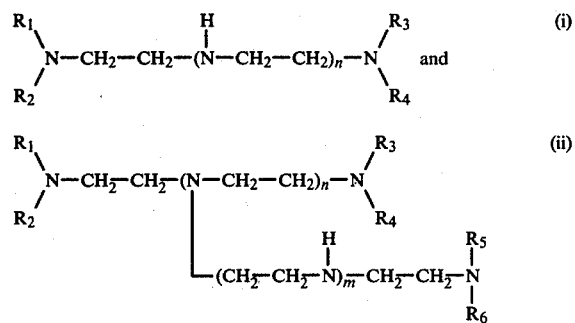

wherein $R_1$, $R_2$, $R_3$, $R_4$, $R_5$ and $R_6$ are independently selected from the group consisting of hydrogen and $C_1$ to $C_{22}$ straight and branched chain alkyl groups, more preferably hydrogen and $C_1$ to $C_4$ alkyl groups, and most preferably hydrogen and methyl, wherein $n=1,2,3$, or 4 and $m=0,1,2$, or 3, wherein the sum of n and m in formula (ii) is preferably 1 to 4, more preferably 1 or 2, and most preferably 1. Typical but non-limiting examples are triethylenetetramine, normal and iso-hexamethyltriethylenetetramine, 2,2',2''-triaminotriethylamine, diethylenetriamine, dodecyldiethylenetriamine, pentamethyldiethylenetriamine, and tetraethylenepentamine.

In order to achieve good melt flow, it is important to incorporate the critically selected polydentate amine into the neutralized sulfonated elastomer at about 0.1 to about 40 parts by weight per hundred of the neutralized sulfonated elastomeric polymer, more preferably at about 0.3 to about 30, and most preferably at about 9 to about 25.

Substantial improvements in rheological properties are obtainable with a variety of cations. Of the many useful cations, Zn, Pb, Ba, Ca, Mg, K, and Na are preferred. Most preferred are Na, Mg, Ba, and Zn which provide polydentate amine plasticized gums with ready melt processability as well as adequate physical properties.

The polydentate amines can be incorporated into the unplasticized gums in a number of ways. One means is the addition of the plasticizer to the cement of the sulfonated and neutralized polymer prior to its isolation during the manufacturing process. The resultant plasticized polymer can still have sufficiently high viscosity and integrity at the usual temperatures of drying so that it could be easily and conveniently dried in a tumble dryer or fluid bed dryer with hot air at for example 100° C. Yet the plasticized polymer can be made to possess sufficiently low viscosity so that it may be dewatered and dried in a dewatering extruder.

Polydentate amines can also be added to the gums through the solution of already isolated and dried unplasticized gums and the addition of the amine to this solution. The resultant blend is isolated in the usual manner. Alternatively, it is possible to flux the gum and the polydentate amine in high intensity high shear mixers such as Banbury mixers and Farrell continuous mixers. To the blend compositions of the neutralized sulfonated polymers can be optionally added at least one additive selected from the group consisting of inorganic fillers, polyolefinic thermoplastic resin reinforcing agents, non-polar process oil having less than 2 wt. % polars, and waxes.

The fillers employed in the elastomeric blend compositions of the present invention are selected from talcs, ground calcium carbonate, water precipitated calcium carbonate, or delaminated, calcined or hydrated clays and mixtures thereof. These fillers are incorporated into the blend composition at about 25 to about 350 parts by weight per 100 parts of the neutralized sulfonated polymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

ASTM Type 102 or naphthenics ASTM Type 104A, wherein the oil has a flash point by the Cleveland open cup of at least 350° F., a pour point of less than 40° F., a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 25 to about 200 parts by weight per 100 parts of the neutralized sulfonated polymer; more preferably at about 25 to about 150, and most preferably at about 50 to about 150.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as stiffness of the elastomeric article. Typically, the crystalline polyolefinic thermoplastic is added to the blend composition at a concentration level of about 0 to about 100 parts by weight per 100 parts of the neutralized sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha-olefins. Most preferably the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, poly-

TABLE I

| Filler | Code # | Oil Absorption grams of oil/100g of filler | Specific gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate | Mistron Vapor | 60–70 | 2.75 | 2 | 9.0–7.5 |

The preferred oils employed in the elastomeric blend compopositions of the present invention are non-polar process oils having less than about 2 wt. % polar type compounds as measured by molecular type clay gel analysis. These oils are selected from paraffinics ASTM Type 104B as defined in ASTM-D-2226-70, aromatics ethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment as well as a means for improving the ionic bonding force between the sulfonate groups in the sulfonated elastomeric polymer. The zinc oxide is incorporated into the blend composition at a concentration level of about 0 to about 25 parts by weight per 100 parts of the neutralized sulfonated polymer, more preferably about 0 to about 15. Alternatively, a Rutile or Anatese titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 10 parts by weight per 100 parts of the neutralized sulfonated elastomeric polymer, wherein the metal ion of the metallic hydroxide is selected from Group II-A of the Periodic Table of Elements such as barium, calcium or magnesium.

A lubricant can be employed in the blend composition at a concentration level of about 0 to about 20 parts by weight per 100 parts of the neutralized sulfonated elastomeric polymers, and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of silica, carbon black, or calcium silicate and mixtures therein. These reinforcing agents are generally characterized as having particle sizes below 0.1 microns and oil absorption above about 100. These reinforcing fillers are incorporated in the blend composition at about 0 to 50 parts by weight per 100 parts of the neutralized sulfonated polymer, more preferably 0 to 25.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

DESCRIPTION OF THE PREFERRED EMBODIMENTS

EXAMPLE 1

PREPARATION OF A ZINC NEUTRALIZED, LIGHTLY SULFONATED ELASTOMER

An EPDM was used as the backbone elastomeric polymer. It had a composition of about 52 wt. % ethylene, 43 wt. % propylene and 5 wt. % of 5-ethylidene-2-norbornene, and it had a Mooney viscosity ML at 100° C. (1+8 min.) of about 20. This material was formed by the thermal breakdown of a 40 Mooney EPDM Vistalon 2504 which is manufactured by Exxon Chemical Company. This base polymer was lightly sulfonated using acetyl sulfate in accordance with the method disclosed in U.S. Pat. No. 3,836,511, to a sulfonate level of about 32 meq. per 100 g of base polymer. This lightly sulfonated elastomer was neutralized in solution by the addition of excess zinc acetate at a concentration of about 60 meq. per 100 g of polymer. This material was steam stripped and then dried in a fluidized bed hot air drier. This material was utilized for the preparation of some of the samples which are described in the following examples. This zinc neutralized lightly sulfonated EPDM was quite tough even at elevated temperatures, and it was too intractable to be fabricated by rapid polymer processing techniques such as extrusion or injection molding.

EXAMPLE 2

MELT INCORPORATION OF A POLYDENTATE AMINE INTO A NEUTRALIZED LIGHTLY SULFONATED ELASTOMER

The polydentate amine triethylenetetramine was added to the non-plasticized zinc neutralized sulfonated elastomer prepared in Example 1 in a Brabender Plasticorder having a 60 ml. mixing head with Banbury mixers. The mixing was done at 50 RPM and about 160° C. The plasticized mixes were prepared at a range of different concentrations using the following procedure. The non-plasticized gum was added to the mixing head in the form of a coarse crumb. It was packed to fill up the mixing head, and then the first level of the additive was added. About 3 minutes after adding the triethylenetetramine the material was mixing well and the mix was well homogenized. At this point a small sample of about 6 g was removed from the melt through the gate of the mixing head. Then the second level of the plasticizer was added and additional non-plasticized sulfonated EPDM gum was added to fill the mixing head. This material was mixed until it was mixing well and the torque reading had stabilized; usually this took about 3 minutes, and then a second sample of about 6 g was removed from the mixing head. Calculations of wt. % additive for these samples took into consideration the sample previously removed as well as the additional additive and non-plasticized gum added after the earlier sample was taken. After the second sample was removed and weighed, the third level of the additive was added and also additional nonplasticized gum to adequately fill the Brabender mixing head so that the gate was just barely bouncing. The amount of nonplasticized gum needed was determined by running the mixing head for a short time (roughly 15 seconds) and observing whether the gate was bouncing slightly—indicating a filled mixing head. After about 3 minutes mixing at this concentration, the mixing torque had stabilized and the sample was well homogenized. This procedure was continued until samples had been made at all of the desired concentrations. After the mixing at the last concentration was completed, the full sample was removed from the mixing head and sheeted out with a single pass through a two roll mill having a roll separation of about 0.04 inches.

EXAMPLE 3

MELT FLOW PROPERTIES OF A ZINC NETURALIZED LIGHTLY SULFONATED EPDM PLASTICIZED WITH VARIOUS CONCENTRATIONS OF A POLYDENTATE AMINE

Samples of the zinc neutralized sulfonated EPDM prepared in Example 1 were plasticized with various levels of triethylenetetramine in the Brabender mixing head using the procedure described in Example 2. The concentrations of this polydentate amine in the seven samples made were 1.1, 2.1, 3.1, 4.4, 6.5, 11.0 and 16.8 wt. percent. Satisfactory mixing was achieved at all concentrations, though the melt was considerably tougher and more difficult to mix at the lowest concentration.

Melt flow rates for the various materials were determined at 190° C. which is in the range of typical processing temperatures for lightly sulfonated EPDM. The melt index instrument specified in ASTM 1238-70 was used, with the standard capillary. The weight of the probe plus the added weight was 12.5 kilograms. Flow rates were measured electronically as probe displacement per minute, and these results were converted to grams per 10 minutes using a conversion factor.

The melt flow rates for these plasticized lightly sulfonated EPDM samples are shown in Table III. These results show that a zinc neutralized, lightly sulfonated EPDM material plasticized with the polydentate amine triethylenetetramine results in much improved melt flow rates. The improvement in melt flow rate is particularly spectacular at concentrations below about 3 wt. percent of additive, and this means that less of this polydentate amine is needed to achieve a specified melt flow rate than almost any other additive.

TABLE III

MELT FLOW RATES OF A ZINC NEUTRALIZED SULFONATED EPDM GUM PLASTICIZED WITH TRIETHYLENETETRAMINE AT DIFFERENT CONCENTRATIONS

| Wt. Percent of Triethylenetetramine | Melt Flow Rate (g/10 min.) |
|---|---|
| 1.1 | 0.032 |
| 2.1 | 0.241 |
| 3.1 | 0.658 |
| 4.4 | 0.604 |
| 6.5 | 0.620 |
| 11.0 | 1.28 |
| 16.8 | 2.79 |

EXAMPLE 4

COMPARISON OF THE MELT FLOW RATES OF A ZINC NEUTRALIZED EPDM GUM PLASTICIZED WITH DIFFERENT FUNCTIONAL GROUPS

Samples of the non-plasticized zinc neutralized gum described in Example 1 were mixed with various additives having different functional groups. Melt flow rates were measured using the procedure described in Example 3. The data are presented in Table IV.

The functional groups included in Table IV include polydentate amines, an ester, a ketone, a phthalate, an alcohol and a nitrile as well as a $C_{18}$ was and the nonplasticized gum for reference. Each material was incorporated in the nonplasticized lightly sulfonated EPDM at a concentration of about 60 meq. per 100 g of gum. The mixes which resulted in very low melt flow rate compositions (see Table IV) were difficult to mix and required longer times (perhaps 10 minutes or slightly longer) in the Brabender mixer. Also, these low melt flow rate compositions tended to mix as chunks rather than forming a coherent sheet or melt within the mixer. For example, the nitrile and ketone plasticized samples were particularly difficult to mix. However, it appeared that adequate dispersion of the additive in each of the samples was accomplished, and the material removed from the mixer appeared to be uniform in all cases.

TABLE IV

COMPARISON OF VARIOUS FUNCTIONAL TYPES AS ADDITIVES TO A ZINC NEUTRALIZED SULFONATED EPDM

| Additive | Concentration (meq/100g gum) | Wt. % | Melt Flow Rate (g/lo min.) |
|---|---|---|---|
| Triethylenetetramine | 60 | 8.0 | 0.56 |
| n-hexamethyl triethylenetetramine | 60 | 11.2 | 4.0 |
| Butylstearate | 60 | 17.0 | 0.10 |
| 6-undecanone | 60 | 9.3 | 0.02 |
| Didodecyl phthalate | 60 | 23.1 | 0.15 |
| Octadecylalcohol | 60 | 13.9 | 0.36 |
| Stearonitrile | 60 | 13.7 | 0.15 |
| Octadecane | 60 | 13.3 | 0.19 |
| None | — | — | 0.007 |

The seven additives with functional groups shown here all have dipole moments well above 0.6 Debyes, so the prior art does not distinguish between which will be the more effective additives; yet, when used at similar molar concentrations there is an enormous difference between the poorest and the best flow improver here. There are two polydentate amines in this table the polydentate amine triethylenetetramine has a higher melt flow rate than any of the non-amine additives in Table IV even though it has the lowest weight fraction concentration. The other polydentate amine, n-hexamethyltriethylenetetramine gives a particularly high melt flow rate of 4 g/10 min. Its very high flow rate is probably caused partly by its good compatability with the polymer as well as by its polydentate amine structure.

These results show that numerous organic chemicals having high dipole moments are relatively poor as melt flow improvers when used at high concentrations in a sulfonated elastomer. It is noteworthy that the polydentate amines in Table IV have some of the lowest dipole moments of the functional groups listed there, yet they are the most effective plasticizers by far.

EXAMPLE 5

MELT FLOW PROPERTIES OF A SODIUM NEUTRALIZED LIGHTLY SULFONATED EPDM PLASTICIZED WITH A POLYDENTATE AMINE AT DIFFERENT CONCENTRATIONS

The non-plasticized sodium neutralized lightly sulfonated EPDM utilized in this example was prepared in a manner similar to the zinc neutralized sulfonated EPDM described in Example 1 except that 60 meq. of sodium acetate per 100 g of polymer was used for neutralization instead of the zinc acetate, and the starting EPDM backbone polymer was different. The EPDM polymer used in this sulfonation was directly polymerized to a Mooney viscosity ML at 100° C. (1+8 min.) of about 20, and it had an ethylene content of about 56 wt. %. It was sulfonated to a level of about 32 meq. per 100 g of base polymer and was neutralized with 60 meq. of sodium acetate per 100 g of polymer. This non-plasticized sodium neutralized sulfonated EPDM was extremely tough even at 200° C.; it was far tougher than the zinc neutralized sulfonated EPDM described in Example 1, and it was too intractable to be fabricated by extrusion or injection molding. Its melt flow rate at 190° C. and 250 psi load was too low to be measured (less than 0.00002 g/10 min.).

The polydentate amine triethylenetetramine was added to the sodium neutralized sulfonated EPDM in a Brabender Plasticorder using the procedure described in Example 2, and samples having a range of different concentrations of the additive were prepared.

At the lowest concentration of triethylenetetramine, 1.0 wt. %, the mix did not fuse into a melt, but remained a powder. However, after the second addition of the plasticizer to make a concentration of 3.1 wt. %, the mix fluxed nicely forming a coherent and only slightly rough mass in the Brabender mixer.

Melt flow rates were measured on these materials using the procedure described in Example 3; the results are shown in Table V. At the lowest concentration of triethylenetetramine, 1 wt. %, the melt flow rate is quite slow—only 0.001 g/10 min. However, this was over 50 times the melt flow rate of the nonplasticized sodium neutralized sulfonated EPDM. As the concentration of this polydentate amine was increased, it is seen in Table V that the melt flow rate of the plasticized gum increased remarkably until at a concentration of 15 wt. % the melt flow rate is almost 3 g/10 min. These results show that triethylenetetramine is a very highly effective melt flow promoter for a sodium neutralized sulfonated EPDM. Utilization of this polydentate amine converted the sodium neutralized EPDM from an intractable material to a readily processable thermoplastic elastomer.

TABLE V

MELT FLOW RATE OF A SODIUM NEUTRALIZED SULFONATED EPDM AS A FUNCTION OF CONCENTRATION OF TRIETHYLENETETRAMINE

| Wt. Percent of Triethylenetetramine | Melt Flow Rate* (g/10 min.) |
|---|---|
| 0 | <0.00002 |
| 1.0 | 0.001 |
| 3.1 | 0.017 |
| 6.2 | 0.072 |

TABLE V-continued

MELT FLOW RATE OF A SODIUM NEUTRALIZED SULFONATED EPDM AS A FUNCTION OF CONCENTRATION OF TRIETHYLENETETRAMINE

| Wt. Percent of Triethylenetetramine | Melt Flow Rate* (g/10 min.) |
|---|---|
| 15.1 | 2.9 |

*190° C., 250 psi loading

EXAMPLE 6

MELT FLOW RATES OF A SODIUM NEUTRALIZED SULFONATED EPDM PLASTICIZED WITH ADDITIVES HAVING DIFFERENT FUNCTIONAL GROUPS AT VARIOUS CONCENTRATIONS

Samples of the non-plasticized sodium neutralized sulfonated EPDM described in Example 5 were combined with several different additives having various functional groups. The melt flow rates were measured in the manner described in Example 3. The results are shown in Table VI. The additives shown in Table VI include a wax, an amide, a monodentate amine, and a ketone. Because of the relatively poor flow promoting effectiveness of these additives in the sodium neutralized sulfonated EPDM, in some of these mixes triethylenetetramine was first added to the non-plasticized gum prior to incorporation of the other additives so that the melt flow rates would be in a measurable range. Further changes in melt flow rate caused by addition of the "other additive" could then be measured.

As might be expected, the wax was a very poor melt flow promoter. The 9-heptadecanone is only a slightly better flow promoter than the wax. At high concentration the N, N diethyldodecanamide is slightly better than the ketone, but it is still not a very good melt flow promoter in this sodium neutralized sulfonated EPDM. This result is in contrast to the zinc neutralized sulfonated EPDM where N, N diethyldodecanamide was found to be an effective melt flow promoter. This illustrates that the relative plasticizing effectiveness of an additive can depend on the cation of the ionic polymer.

Of particular interest in Table VI is the monodentate amine octadecylamine. In a zinc neutralized sulfonated EPDM, octadecylamine had been found to be an effective melt flow promoter. However, it is seen that in this sodium neutralized sulfonated EPDM it has relatively low effectiveness. This result can be compared to the polydentate amine triethylenetetramine for which data was given in Table V. It is clear that the polydentate amine is orders of magnitude more effective as a flow promoter in the sodium neutralized sulfonated EPDM as compared to the monodentate amine. This shows that the structure of the amine, e.g. polydentate versus monodentate, is of the utmost importance in determining its effectiveness as a plasticizer.

TABLE VI

MELT FLOW RATES OF A SODIUM NEUTRALIZED SULFONATED EPDM PLASTICIZED WITH ADDITIVES HAVING VARIOUS FUNCTIONAL GROUPS

| Other Additive | Wt. % of Other Additive | Wt. % of Triethylenetetramine | Total wt. % of Additives | Melt Flow Rate (g/10 min.) |
|---|---|---|---|---|
| Hexatriacontane | 21.7 | — | 21.7 | 0.00003 |
| N,N-Diethyldodecanamide | 7.7 | — | 7.7 | 0.003 |
| N,N-Diethyldodecanamide | 18.8 | — | 18.8 | 0.010 |
| Octadecylamine | — | 2.2 | 2.2 | 0.007 |
| Octadecylamine | 7.5 | 2.1 | 9.6 | 0.010 |
| Octadecylamine | 18.7 | 1.8 | 20.5 | 0.082 |

TABLE VI-continued
MELT FLOW RATES OF A SODIUM NEUTRALIZED SULFONATED EPDM PLASTICIZED WITH ADDITIVES HAVING VARIOUS FUNCTIONAL GROUPS

| Other Additive | Wt. % of Other Additive | Wt. % of Triethylenetetramine | Total wt. % of Additives | Melt Flow Rate (g/10 min.) |
|---|---|---|---|---|
| N,N-Diethyldodecanamide | — | 2.3 | 2.3 | 0.005 |
| N,N-Diethyldodecanamide | 2.9 | 2.2 | 5.1 | 0.007 |
| N,N-Diethyldodecanamide | 7.3 | 2.1 | 9.4 | 0.017 |
| N,N-Diethyldodecanamide | 18.5 | 1.8 | 20.3 | 0.173 |
| 9-Heptadecanone | — | 2.7 | 2.7 | 0.008 |
| 9-Heptadecanone | 3.6 | 2.6 | 6.2 | 0.012 |
| 9-Heptadecanone | 9.0 | 2.5 | 11.5 | 0.024 |
| 9-Heptadecanone | 22.0 | 2.1 | 24.1 | 0.125 |
| Hexatriacontane | — | 2.7 | 2.7 | 0.008 |
| Hexatriacontane | 9.0 | 2.5 | 11.5 | 0.015 |
| Hexatriacontane | 22.0 | 2.1 | 24.1 | 0.052 |

EXAMPLE 7

MELT FLOW OF A MAGNESIUM NEUTRALIZED SULFONATED EPDM PLASTICIZED WITH A POLYDENIATE AMINE

The non-plasticized magnesium neutralized sulfonated EPDM used in this example was prepared from the same EPDM polymer and in the same manner as the sodium neutralized sulfonated EPDM described in Example 5, except that 60 meq. of magnesium acetate per 100 g of polymer was used for neutralization instead of the sodium acetate. This non-plasticized magnesium neutralized sulfonated EPDM was much tougher than the zinc neutralized sulfonated EPDM described in Example 1, and it was too tough to be extruded at 200° C. Also, its melt flow rate was too low to be measured at 190° C. and 250 psi load (less than 0.00002 g/10 min.).

Triethylenetetramine was added to the magnesium neutralized sulfonated EPDM at various concentrations using the procedures described in Example 2. At the lowest concentration of plasticizer used, 1.0 wt. %, the mix was well fused in the mixing head, but it was a somewhat "dry" and tough mix which was chunky rather than smooth. At the higher concentrations of additive the mix was relatively smooth and coherent.

The methods discussed in Example 3 were used to measure the melt flow rates of these materials; results are shown in Table VII. It is seen that the triethylenetetramine is a highly effective plasticizer for the magnesium neutralized sulfonated EPDM, and that low concentrations of this polydentate amine change the intractable non-plasticized gum into an easily melt processable thermoplastic elastomer.

TABLE VII
MELT FLOW RATES OF A MAGNESIUM NEUTRALIZED SULFONATED EPDM PLASTICIZED WITH TRIETHYLENETETRAMINE

| Wt. Percent of Triethylenetetramine | Melt Flow Rate (g/10 min.), 190° C., 250 psi |
|---|---|
| 0 | 0.00002 |
| 1.0 | 0.002 |
| 3.0 | 0.25 |
| 5.8 | 0.78 |
| 14.3 | 3.7 |

EXAMPLE 8

MELT FLOW OF A MAGNESIUM NEUTRALIZED SULFONATED EPDM PLASTICIZED WITH ADDITIVES HAVING VARIOUS FUNCTIONAL GROUPS

Additives having various functional groups were combined with samples of the magnesium neutralized sulfonated EPDM described in Example 7. Melt flow rates for these plasticized samples are given in Table VIII. Because of the relatively poor flow promoting effectiveness of these additives in the magnesium neutralized sulfonated EPDM, a small amount of triethylenetetramine was added to the non-plasticized gum prior to incorporation of the other additive so that the melt flow rates would be in a readily measurable range. The functional types included in Table VIII are an amide, a ketone, and a monodentate amine. By comparing the data in Table VIII with the results in Table VIII for triethylenetetramine it is seen that the triethylenetetramine is a far better plasticizer than any of the other additives in Table VIII. In particular, the monodentate amine in Table VIII, octadecylamine is no where near as effective of a plasticizer as the polydentate amine triethylenetetramine. This illustrates again that the structure of the amine is of prime importance in determining the effectiveness of plasticization.

TABLE VIII
MELT FLOW RATES FOR A MAGNESIUM NEUTRALIZED SULFONATED EPDM PLASTICIZED WITH DIFFERENT ADDITIVES

| Other Additive | Wt. % of Other Additive | Wt. % of Triethylenetetramine | Total Wt. % of Additives | Melt Flow Rate (g/10 min.) |
|---|---|---|---|---|
| N,N-Diethyldodecanamide | — | 1.6 | 1.6 | 0.020 |
| N,N-Diethyldodecanamide | 3.2 | 1.5 | 4.7 | 0.030 |
| N,N-Diethyldodecanamide | 8.0 | 1.4 | 9.4 | 0.085 |
| N,N-Diethyldodecanamide | 20.0 | 1.3 | 21.3 | 0.310 |
| Octadecylamine | — | 1.1 | 1.1 | 0.003 |
| Octadecylamine | 1.6 | 1.3 | 2.9 | 0.010 |
| Octadecylamine | 4.0 | 1.3 | 5.3 | 0.016 |
| Octadecylamine | 8.9 | 1.2 | 10.1 | 0.050 |
| Octadecylamine | 20.3 | 1.0 | 21.3 | 0.700 |

TABLE VIII-continued
MELT FLOW RATES FOR A MAGNESIUM NEUTRALIZED SULFONATED EPDM PLASTICIZED WITH DIFFERENT ADDITIVES

| Other Additive | Wt. % of Other Additive | Wt. % of Tri-ethylenetetramine | Total Wt. % of Additives | Melt Flow Rate (g/10 min.) |
|---|---|---|---|---|
| 9-Heptadecanone | — | 1.6 | 1.6 | 0.018 |
| 9-Heptadecanone | 3.3 | 1.6 | 4.9 | 0.027 |
| 9-Heptadecanone | 8.2 | 1.5 | 9.7 | 0.038 |
| 9-Heptadecanone | 20.4 | 1.3 | 21.7 | 0.230 |

EXAMPLE 9
TENSILE PROPERTIES OF SOME POLYDENTATE AMINE IN A ZINC NEUTRALIZED SULFONATED EPDM

In example 4, the melt flow rates of various plasticized zinc neutralized sulfonated EPDM's were given. In this example, some tensile properties of the two polydentate amines, triethylenetetramine and n-hexamethyltriethylenetetramine included in Example 4 are presented. Test pads were made from each of these samples prepared in Example 2, by compression molding at 350° F. The procedure was to preheat the empty mold plates in the press for a few minutes, then the material was put in the mold and the mold containing the material was preheated in the press with the mold plates slightly open for two minutes. Then the mold plates were pressed closed under a force of about 20 tons for two minutes. The samples were cooled in the molds under pressure for two minutes. Microtensile pads having a thickness of about 0.6 mm and test regions measuring 2.54 mm in width and 12.7 mm in length were cut from the test pads with a die. The samples were stored in closed dry bottles for one or more days prior to tensile testing.

Tensile strengths of the samples were measured with an Instron TM table model instrument, using a pulling speed of 51 mm per minute. Measurements were made at room temperature (25° C.) and at an elevated temperature. In the measurements at elevated temperature, after being placed in the testing oven, a 3 minute waiting period was allowed before pulling to enable the sample to equilibrate with the oven temperature.

Some tensile properties for the zinc neutralized sulfonated EPDM's plasticized with n-hexamethyltriethylenetetramine or triethylenetetramine are presented in Table IX. The triethylenetetramine plasticized sample has good strength at room temperature, and it retains appreciable strength at 70° C., though considerably lower than at room temperature. The n-hexamethyltriethylenetetramine plasticized sample has somewhat lower strength than the triethylenetetramine plasticized sample. The lower strength is probably a result of the very high melt flow rate of the n-hexamethyltriethylenetetramine plasticized sample as seen in Table IV; the strength could be improved by decreasing the concentration of plasticizer.

TABLE IX
TENSILE PROPERTIES OF A ZINC NEUTRALIZED

| | | | Tensile Properties | | |
|---|---|---|---|---|---|
| Additive | Concentration (Wt. %) | Temperature (°C.) | Maximum Strength (psi) | Initial Modulus (psi) | Elongation (%) |
| Triethylenetetramine | 8.0 | 25 | 1010 | 325 | 570 |
| Triethylenetetramine | 8.0 | 70 | 170 | 245 | 800 |
| n-Hexamethyltriethylenetetramine | 11 | 70 | 50 | 175 | 560 |

EXAMPLE 10
HIGH TEMPERATURE TENSILE PROPERTIES OF A POLYDENTATE AMINE IN A MAGNESIUM AND A SODIUM NEUTRALIZED SULFONATED EPDM

In this example it is shown that substantial tensile strength can be obtained at a high temperature (120° C.) for a thermoplastic elastomer by utilizing sodium or magnesium neutralized sulfonated EPDM's plasticized with a polydentate amine. The samples utilized for these measurements were triethylenetetramine plasticized samples from Examples 5 and 7. From Example 5, the 3.1 wt. % sample was used, and from Example 7, the 1.0 wt. % sample was used. The preparation of samples and the measurement procedure were described in Example 9. The results are shown in Table X. It is seen from Table X that excellent tensile strengths can be obtained at quite high temperatures by utilizing magnesium or sodium neutralized sulfonated EPDM's plasticized with a polydentate amine. However, it should be noted that there is a tradeoff between tensile strength and rheology, and that the melt flow rates for these high temperatures, high strength materials are relatively low.

TABLE X
TENSILE PROPERTIES AT HIGH TEMPERATURE FOR SULFONATED EPDM's PLASTICIZED WITH A POLYDENTATE AMINE

| | | | Tensile Properties at 120° C. | | |
|---|---|---|---|---|---|
| Additive | Concentration (wt. %) | Neutralizing Cation | Maximum Strength (psi) | Initial Modulus (psi) | Elongation (%) |
| Triethylenetetramine | 1.0 | $Mg^{++}$ | 680 | 490 | 420 |
| Triethylenetetramine | 3.1 | $Na^+$ | 240 | 305 | 625 |

EXAMPLE 11

TENSILE PROPERTIES OF A BARIUM NEUTRALIZED SULFONATED EPDM PLASTICIZED WITH VARIOUS POLYDENTATE AMINES

A barium neutralized sulfonated EPDM containing 0.81 mole percent of sulfonation was utilized in this example. The sulfonated polymer was derived by sulfonation of Vistalon 3708 which is a commercial EPDM manufactured by Exxon Chemical Company. Some of the samples had a polydentate amine added to the nonplasticized barium neutralized sulfonated polymer and other samples also had a processing oil added, Flexon 845, manufactured by Exxon Chemical Company. The additives were incorporated into a dispersion of the sulfonated polymer in hexane, and the dispersion was dried to obtain the product. Tensile samples were prepared and measurements were made using the procedures described in Example 9. The results are shown in Table XI. The polydentate amines were all employed at a concentration of 20 phr (parts per hundred of non-plasticized sulfonated polymer), and the processing oil, when used, was incorporated at 100 phr. Measurements were made at room temperature (25° C.) and at 100° C.

The tensile strengths of the polydentate amine plasticized samples without oil are all excellent at room temperature. When 100 phr of the processing oi, Flexon 845, is added, the tensile strength drops, but it is still substantial. Elongations are excellent for all of the room temperature measurements. At 100° C. the tensile strength had dropped considerably as would be expected for a thermoplastic elastomer such as sulfonated EPDM; however, all of the values are 100 psi or greater which is appreciable for this elevated temperature. This example shows that polydentate amines can plasticize a barium neutralized sulfonated EPDM and that satisfactory tensile strengths can be obtained from the plasticized products.

TABLE XI
TENSILE PROPERTIES OF A BARIUM NEUTRALIZED SULFONATED EPDM*
PLASTICIZED WITH VARIOUS POLYDENTATE AMINES

| Plasticizer | Concentration (phr) | Oil+ (phr) | Temperature (°C.) | Strength (psi) | Elongation (%) |
|---|---|---|---|---|---|
| n-hexamethyltriethylenetetramine | 20 | 0 | 25 | 1934 | 680 |
| iso-hexamethyltriethylenetetramine | 20 | 0 | 25 | 2458 | 690 |
| 2,2',2'' triaminotriethylamine | 20 | 0 | 25 | 2260 | 550 |
| triethylenetetramine | 20 | 0 | 25 | 2640 | 500 |
| n-hexamethyltriethylenetetramine | 20 | 100 | 25 | 575 | 860 |
| iso-hexamethyltriethylenetetramine | 20 | 100 | 25 | 524 | 790 |
| n-hexamethyltriethylenetetramine | 20 | 0 | 100 | 244 | 275 |
| 2,2',2'' triaminotriethylamine | 20 | 0 | 100 | 108 | 550 |
| triethylenetetramine | 20 | 0 | 100 | 187 | 550 |
| n-hexamethyltriethylenetetramine | 20 | 100 | 100 | 96 | 350 |
| iso-hexamethyltriethylenetetramine | 20 | 100 | 100 | 115 | 350 |

*0.81 mole % of sulfonation
+ Flexon 845, manufactured by Exxon Chemical Company Since many modifications and variations of this invention may be made without departing from the spirit or scope of the invention thereof, it is not intended to limit the spirit or scope thereof to the specific examples thereof.

What is claimed is:

1. An elastomeric composition including:
   (a) a neutralized sulfonated elastomeric polymer having about 10 to 80 meq. of neutralized sulfonate groups/100 grams of said neutralized sulfonated polymer, and
   (b) about 0.1 to about 40 parts by weight of a polydentate amine per 100 parts of neutralized sulfonated polymer, said polydentate amine having a structure selected from the group consisting of:

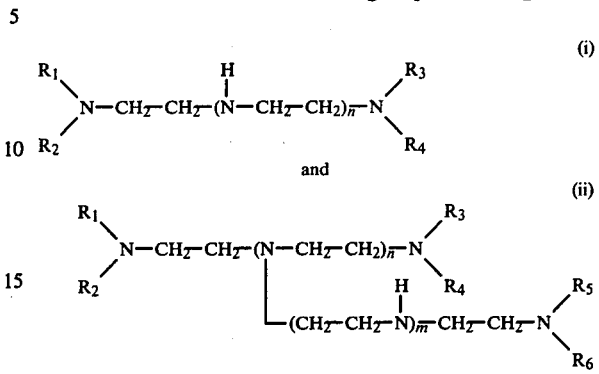

wherein $R_1$, $R_2$, $R_3$, $R_4$, $R_5$ and $R_6$ are independently selected from the group consisting of hydrogen, and $C_1$ to $C_{22}$ straight and branched chain alkyl groups, n being 1,2,3 or 4 and m being 0,1,2, or 3.

2. An elastomeric composition according to claim 1 wherein said neutralized sulfonated elastomeric polymer is derived from an elastomeric polymer selected from the group consisting of EPDM terpolymers and Butyl Rubber.

3. An elastomeric composition according to claim 1 wherein said neutralized elastomeric polymer is derived from an EPDM terpolymer having a Mooney viscosity (ML 1+8, 212° F.) of about 5 to about 60.

4. An elastomeric composition according to claim 1 wherein said neutralized sulfonate groups have a counterion selected from the group consisting of iron, lead, antimony and Groups IA, IIA, IB and IIB of the Periodic Table of Elements.

5. An elastomeric composition according to claim 1 further including at least one additive selected from the group consisting of fillers, reinforcing agents, non-polar process oils, waxes, and polyolefinic thermoplastics and mixtures thereof.

6. An elastomeric composition according to claim 1 wherein said polydentate amine is present at a concentration level of at least about 9 parts by weight per 100 parts of said neutralized sulfonated elastomeric polymer.

7. An elastomeric article formed from an elastomeric composition which includes:

(a) a neutralized sulfonated elastomeric polymer having about 10 to 80 meq. of neutralized sulfonate groups/100 grams of said neutralized sulfonated polymer, and (b) about 0.1 to about 40 parts by weight of a polydentate amine per 100 parts of neutralized sulfonated polymer, said polydentate amine having a structure selected from the group consisting of:

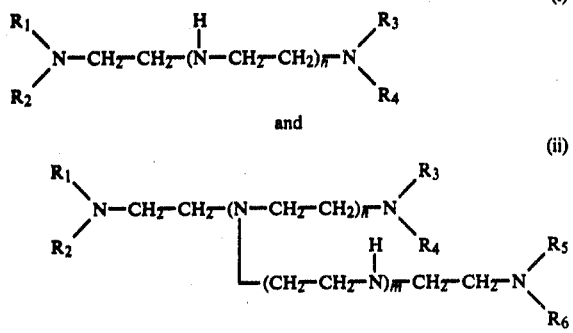

wherein $R_1$, $R_2$, $R_3$, $R_4$, $R_5$ and $R_6$ are independently selected from the group consisting of hydrogen, and $C_1$ to $C_{22}$ straight and branched chain alkyl groups, n being 1,2,3 or 4 and m being 0,1,2, or 3.

8. An elastomeric article according to claim 7 wherein said neutralized sulfonated elastomeric polymer is derived from an elastomeric polymer selected from the group consisting of EPDM terpolymers and Butyl Rubber.

9. An elastomeric article according to claim 7 wherein said neutralized elastomeric polymer is derived from an EPDM terpolymer having a Mooney viscosity (ML 1+8, 212° F.) of about 5 to about 60.

10. An elastomeric article according to claim 7 wherein said neutralized sulfonate groups have a counterion selected from the group consisting of iron, lead, antimony and Groups IA, IIA, IB and IIB of the Periodic Table of Elements.

11. An elastomeric article according to claim 7 further including at least one additive selected from the group consisting of fillers, reinforcing agents, non-polar process oils, waxes, and polyolefinic thermoplastics and mixtures thereof.

12. An elastomeric article according to claim 7 wherein said polydentate amine is present at a concentration level of at least about 9 parts by weight per 100 parts of said neutralized sulfonated elastomeric polymer.

* * * * *